United States Patent [19]
Seki et al.

[11] Patent Number: 5,258,800
[45] Date of Patent: Nov. 2, 1993

[54] DISTANCE MEASURING DEVICE AND CAMERA HAVING SAME

[75] Inventors: Yoichi Seki; Kazuo Akimoto; Tomihiko Aoyama, all of Chiba, Japan

[73] Assignee: Seikosha Co., Ltd., Tokyo, Japan

[21] Appl. No.: 957,338

[22] Filed: Oct. 6, 1992

[30] Foreign Application Priority Data

Oct. 16, 1991 [JP] Japan ................. 3-267690
Mar. 17, 1992 [JP] Japan ................. 4-060514

[51] Int. Cl.$^5$ ............................... G03B 13/36
[52] U.S. Cl. .......................... 354/402; 354/485
[58] Field of Search ........... 354/400, 402, 403, 406, 354/407, 408, 485, 288

[56] References Cited

U.S. PATENT DOCUMENTS

| | | | |
|---|---|---|---|
| Re. 31,207 | 4/1983 | Tsunekawa et al. | 354/485 |
| 4,114,036 | 9/1978 | Tsunekawa et al. | 354/485 |
| 4,156,567 | 5/1979 | Ostrowshi | 354/288 |
| 4,341,448 | 7/1982 | Toyoda et al. | 354/288 |
| 4,368,965 | 1/1983 | Nemoto | 354/402 |
| 5,136,326 | 8/1992 | Yokota et al. | 354/485 |

Primary Examiner—Russell E. Adams
Attorney, Agent, or Firm—Jordan and Hamburg

[57] ABSTRACT

In the distance measuring device for an automatic focusing camera, the reliability is improved by preventing the device from electric noise, and the structure is simplified so as to provide interchangeability to reduce the production cost. A light receiving lens 2 and a multilayer printed circuit board 3 are mounted on a holder 1. A potting frame 6 is provided on the lens-facing side surface of the printed circuit board 3. An optical sensor 4 and an IC 5 are both mounted within a space 3 enclosed by the potting frame 6, and sealed by a protecting resin 7 simultaneously. Further, resistors S and capacitors C of a distance measuring circuit are mounted on the opposite surface of the printed circuit board 3. Both the surfaces of the printed circuit board 3 are connected to each other via a through hole to construct the distance measuring circuit. The protecting resin 7 transmits light having specified wave lengths. The light reflected from a subject to be photographed is received by the optical sensor 4 after passing through the protecting resin, and a distance to the subject is calculated on the basis of the received light data.

14 Claims, 6 Drawing Sheets

DISTANCE MEASURING DEVICE AND CAMERA HAVING SAME

BACKGROUND OF THE INVENTION

1. Field of the Invention

The present invention relates to a distance measuring device and a camera provided therewith, and more specifically to a distance measuring device incorporated in an automatic focusing camera.

2. Description of the Prior Art

Figure 9:
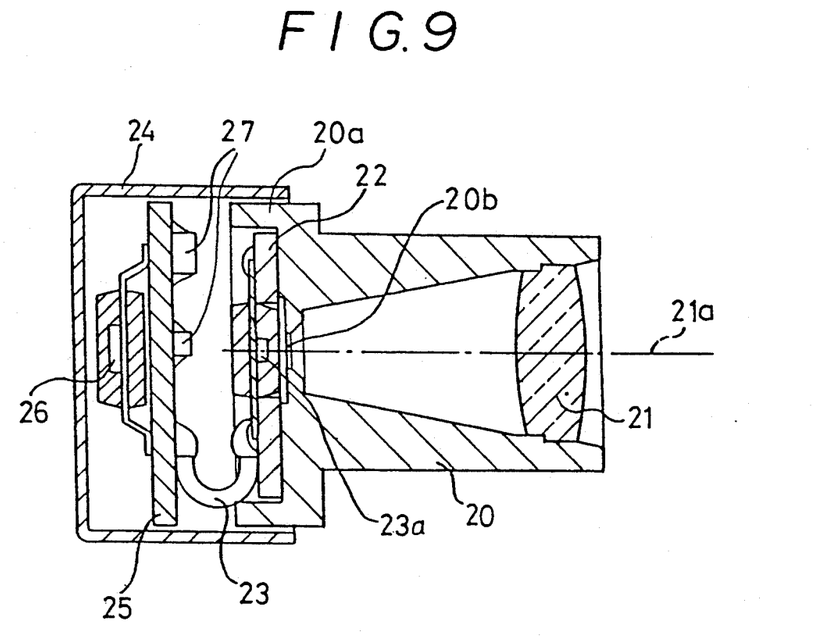
FIG. 9 is a cross-sectional view showing the prior art distance measuring device.

A light receiving section of a distance measuring device incorporated in a prior art automatic focusing camera will be described hereinbelow, by way of example, with reference to FIG. 9. In the drawing, a holder 20 is formed with a lens holding portion for holding a light receiving lens 21 at one end thereof and a substrate supporting frame 20a for supporting a first printed circuit board 22 at the other end thereof. An optical sensor (PSD) 23 of discrete parts for detecting distance is connected to the first printed circuit board 22, in such a way as to be aligned with an optical axis (the same as the geometric axis) 21a of the light receiving lens 21 through an opening 20b formed in the lens holder 20. One end of a flexible cable (referred to as FPC, hereinafter) 23a is connected to the first circuit board 22. The other end of this flexible cable 23a is connected to a second printed circuit board 25 disposed within a cover 24. A distance measuring IC 26 is mounted on this second printed circuit board 25. Further, other electric parts (e.g. resistors, capacitors, etc.) 27 which constitute the measuring circuit are mounted on this second printed circuit board 25.

In the above-mentioned prior art distance measuring device, since the first printed circuit board for mounting the optical sensor 23 and the second printed circuit board 25 for mounting the distance measuring IC 26 and other parts are both provided, the FPC 23a for connecting both the printed circuit boards 22 and 25 to each other and other members for supporting the second printed circuit board 25 in the holder 20 are inevitably required additionally, thus resulting in a problem in that the number of parts increases. In particular, since the optical sensor 23 and the IC 26 packaged as a different discrete parts, respectively are both used, it is difficult to mount the parts within a small space.

In addition, since the sizes and shapes of the second printed circuit board 25 and the cover 24 must be modified according to the models of cameras to facilitate mounting of these parts into a camera, there exists another problem in that these parts lack interchangeability. As described above, the prior art distance measuring device is poor in the camera design freedom and is difficult to reduce the size thereof.

Furthermore, since the optical sensor 23 and the IC 26 are mounted a distance apart away form each other and connected through the FPC cable 23a, there exists a serious problem in that noise is easily superposed upon signals transmitted between both. Although this problem can be overcome to some extent by use of a shielding structure, this countermeasure raises another problem in that the device structure is further complicated.

SUMMARY OF THE INVENTION

With these problems in mind therefore, it is the primary object of the present invention to provide a distance measuring device small in the number of parts, simple in structure and therefore low in manufacturing cost, and high in reliability, without superposing noise upon the signals transmitted between the optical sensor and the IC device, and a camera provided therewith.

Further, another object of the present invention is to provide a distance measuring device high in interchangeability with respect to diversified cameras.

To achieve the above-mentioned embodiment, the distance measuring device according to the present invention comprises a light receiving lens for receiving light to be measured, a printed circuit board having conductive patterns on both surfaces thereof and disposed at a focus position of the light receiving lens, an optical sensor, a distance measuring IC, and electric parts connected to the distance measuring IC so as to construct a part of a distance measuring circuit. The optical sensor and the distance measuring IC are both mounted on the same surface of the printed circuit board on the side which faces the light receiving lens. This optical sensor is positioned on the optical axis of the light receiving lens and connected to the IC. Further, the electric parts are mounted on the surface of the printed circuit board on the side opposite to the surface on which the optical sensor and the IC are mounted.

Further, an electromagnetic shield layer connected to the ground potential is provided between the optical sensor side surface and the opposite surface (electric parts side surface) of the printed circuit board.

The optical sensor and the IC are both of bare chips, and sealed by a protecting resin filled in a potting frame provided at the outer periphery of the printed circuit board.

In this case, it is preferable to form a partition wall integral with the potting frame between the optical sensor and the IC of bare chips. The optical sensor is sealed with a protecting resin which can transmit light having specific wave lengths and the IC is sealed with a protecting resin which can shade light.

Alternatively, it is possible to use a protecting resin hardened to seal at the same time the bare chip state optical sensor mounded on the printed circuit board and the bare chip distance measuring IC also mounted on the printed circuit board in the vicinity of the optical sensor. In this case, a resin which can transmit light having specific wave lengths is used as the protecting resin, and the IC is protected from light by a light shading member disposed in front of the IC. The light shading member is preferably formed integral with the holder.

DETAILED DESCRIPTION OF THE PREFERRED EMBODIMENTS

Figure 1:
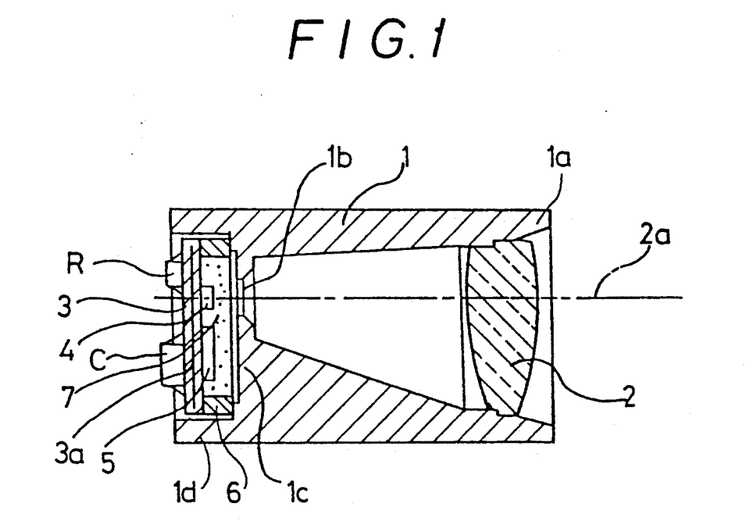
FIG. 1 is a cross-sectional view showing a first embodiment of the distance measuring device according to the present invention.

FIG. 1 shows a first embodiment of the distance measuring device according to the present invention. A light receiving lens 2 is supported at one end of a holder 1 and a printed circuit board 3 is supported at the other end of the holder 1. On the printed circuit board 3, there are mounted electric parts such as a bare chip state optical sensor (PSD) 4 for detecting distance, a bare chip state distance measuring IC 5, resistors R, and capacitors C, etc.

The holder 1 is formed of a light shading plastic and formed into a cylindrical shape. The holder 1 is formed integral with a lens holding portion 1a on one end thereof; and an opening 1b, a light shading portion 1c and a board supporting frame portion 1d at the other end thereof.

Figure 2:
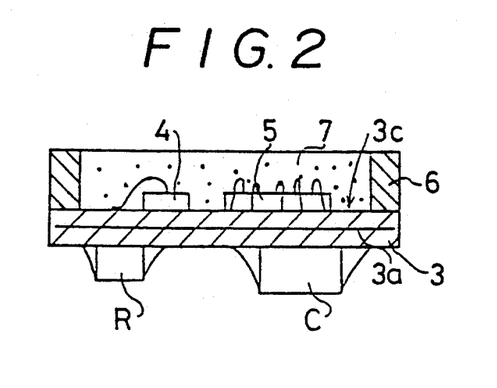
FIG. 2 is an enlarged cross-sectional view showing the circuit block of the first embodiments.
Figure 3:
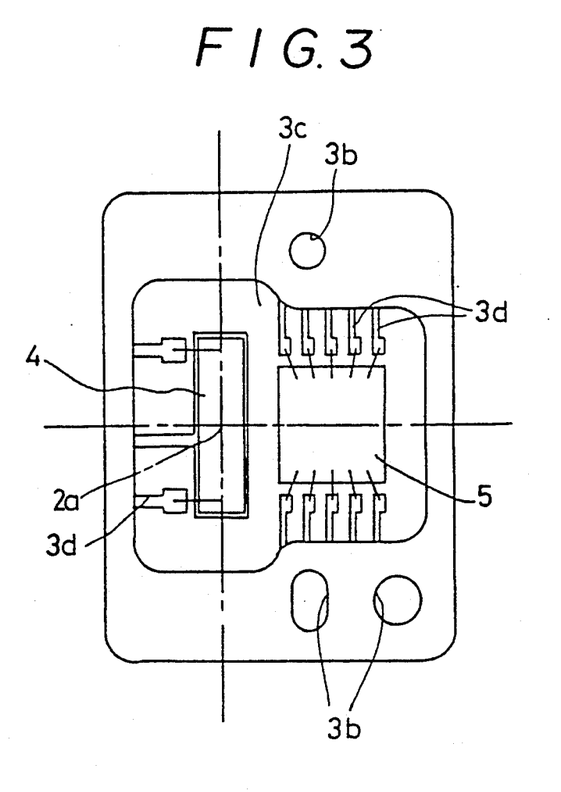
FIG. 3 is an enlarged plan view showing the circuit block shown in FIG. 2, before filled with a protecting resin.

As shown in FIGS. 2 and 3, the printed circuit board 3 is of multilayer printed circuit board such that a GND layer 3a (an electrode layer to which the ground potential is supplied for providing an electromagnetic shielding effect) is formed within the circuit board and conductive patterns 3d are formed on both the surfaces thereof. Further mounting holes 3b are formed in this printed circuit board 3. A frame for potting 6 is provided on one surface of this printed circuit board 3 so as to enclose the outer periphery of the board 3. Within a space 3c of the potting frame 6, the optical sensor 4 and the distance measuring IC 5 are die-bonded and then wire-bonded for connection with the conductive patterns 3d. Under these conditions, a protecting resin 7 such as epoxy resin is filled in the potting frame 6 and then hardened to seal the Optical sensor 4 and the IC 5. On the opposite surface of the printed circuit board 3, electric parts such as resistors R, capacitors C, etc. are connected to conductive patterns (not shown) by soldering. The conductive patterns on both surfaces of the printed circuit board 3 are connected via through holes (not shown) formed in the board 3.

Figure 4:
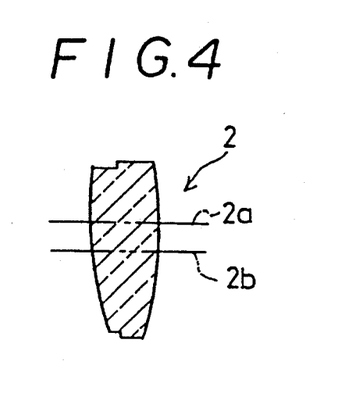
FIG. 4 is an enlarged cross-sectional view showing the light receiving lens of the first embodiment.
Figure 5:
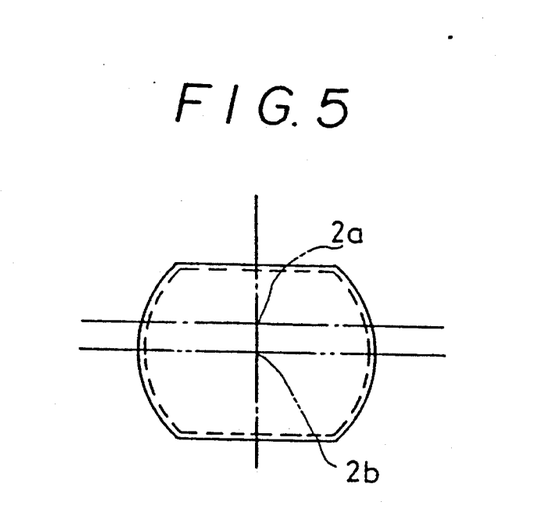
FIG. 5 is an enlarged front view showing the light receiving lens of the first embodiment.

As shown in FIGS. 4 and 5, the light receiving lens 2 of the present embodiment is formed into asymmetrical shape having a large thickness at one end thereof and a small thickness at the other end thereof, which may be obtained by cutting off a part from the ordinary symmetrical lens. Therefore, the optical axis 2a of the asymmetrical lens 2 is offset away from the geometrical axis 2b thereof.

As shown in FIG. 1, in the state where the light receiving lens 2 and the printed circuit board 3 are mounted in the holder 1, the optical sensor 4 is aligned with the optical axis 2a of the light receiving lens through the opening 1b, and further the IC 5 is covered by the light shading portion 1c so that light is not allowed to be incident upon the IC 5. Therefore, light (infrared radiation) is allowed to be incident upon only the optical sensor 4 through the light receiving lens 2, but the IC 5 is shaded from the light by the shading portion 1c, thus preventing the IC 5 from being operated erroneously due to light.

Figure 6:
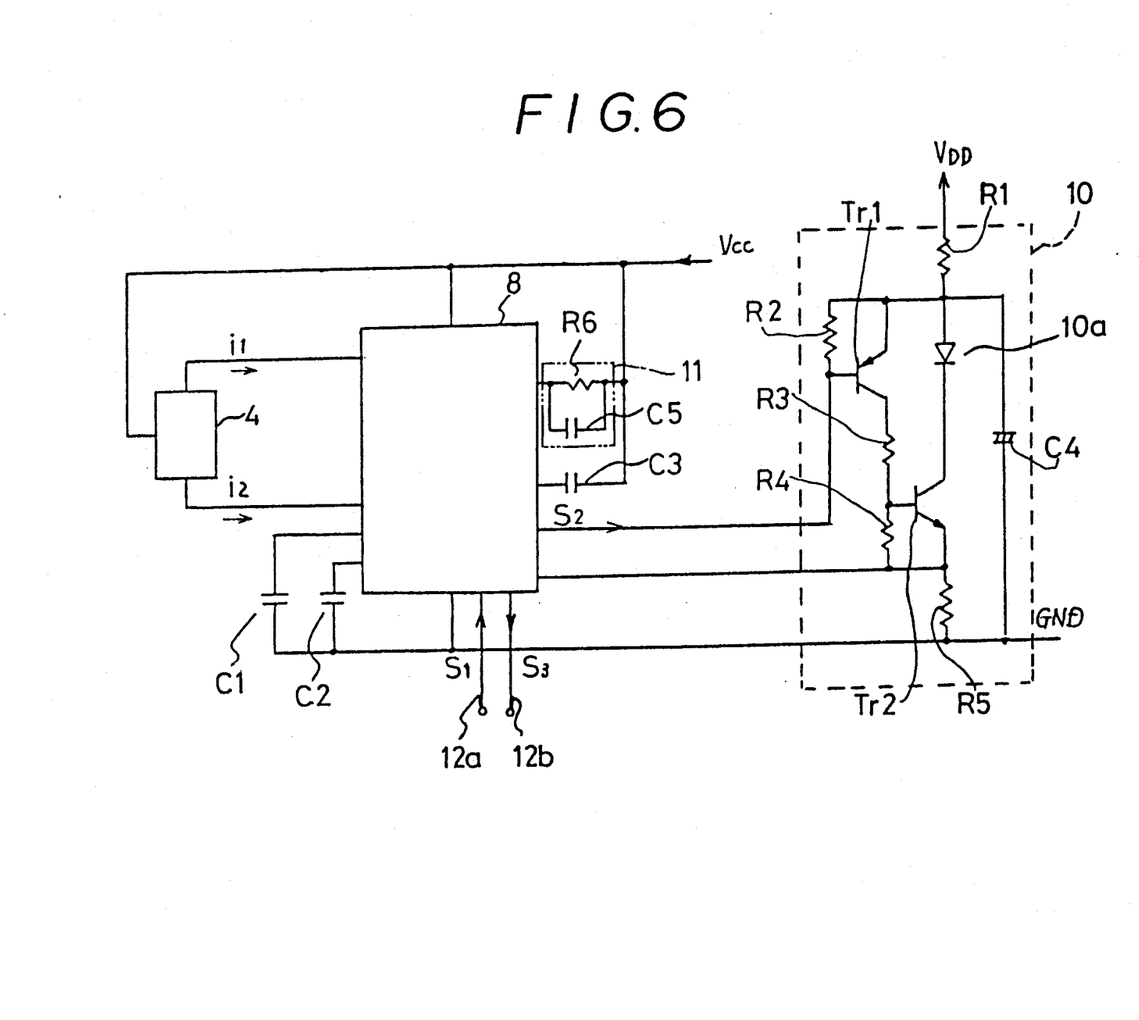
FIG. 6 is a circuit diagram showing the distance measuring circuit of the first embodiment.

The distance measuring circuit will be described hereinbelow with reference to FIG. 6.

A control circuit 8 is constructed by the aforementioned distance measuring IC 5, to which an optical sensor 4, a light emitting means 10, an oscillation circuit 11, capacitors C1, C2 and C3 are connected as shown. The light emitting means 10 is composed of an LED (light emitting diode) 10a, voltage regulating resistors R1, R2, R3, R4 and R5, transistors Tr1 and Tr2, and a capacitor C4. In this embodiment, the optical parts are so selected that the LED 10a can emit near infrared radiation having wave lengths from 880 to 940 nm, and the optical sensor 4 can receive the near infrared radiation having the same wave lengths as above. Further, the protecting resin 7 is so selected as to transmit the near infrared radiation having the same wave lengths.

The oscillation circuit 11 is a CR circuit composed of a resistor R6 and a capacitor C5, which supplies a reference clock signal to the control circuit 8. The capacitors C1 and C2 store the steady light intensity level (light level under the ordinary environment in which the near infrared radiation is not emitted) in the form of voltage level, while the capacitor C3 stores the light intensity level of the light reflected by a subject (not shown) to be photographed, when the near infrared radiation is emitted, also in the form of voltage level. Further, terminals VCC and VDD are connected to a voltage supply (not shown), respectively and a GND terminal is connected to the GND layer 3a shown in FIG. 2. Further, the junction terminals 12a and 12b are connected to a microcomputer (not shown) provided in the camera body.

The operation of the distance measuring circuit constructed as described above will be explained hereinbelow.

First, when the user depresses a release button (not shown) of the camera, the microcomputer provided in the camera body applies a distance measurement start signal S1 to the control circuit 8. In response to this start signal S1, the control circuit 8 transmits an activation signal S2 to the light emitting means 10 to turn on the transistors Tr1 and Tr2 of the light emitting means 10, so that the LED 10a emits the near infrared radiation. Since the near infrared radiation is reflected from a subject to be photographed (not shown), the optical sensor 4 receives the reflected radiation and further the output signal of the optical sensor 4 is transmitted to the control circuit 8. On the basis of this output signal from the optical sensor 4, the control circuit 8 calculates a distance to the subject to be photographed. In more detail, in the case where the optical sensor 4 (see FIG. 2) is of PSD (position sensitive detector) type, the output currents i1 and i2 are given to the control circuit 8 and the control circuit 8 calculates the distance to the subject on the basis of these output currents i1 and i2. A distance data signal S3 obtained as described above is transmitted to the microcomputer in the camera body, so that the microcomputer drives a telescopic lens moving mechanism (not shown) according to the distance data signal S3 for automatic focusing operation.

Further, in practice, since the steady light level is held in the capacitors C1 and C2, the light data based on the steady light level is subtracted from the light data received by the optical sensor 4, to obtain the light data based upon only the reflected light of the near infrared radiation emitted by the light emitting means 10, so that the control circuit 8 can calculate the distance more accurately.

In addition, in practice, the near infrared radiation is emitted several times, and the distance is calculated on the basis of a plurality of light data received by the optical sensor 10 for obtaining a more accurate data. In more detail, the control circuit 8 applies a plurality of start signals to the light emitting means 10 at regular time intervals on the basis of reference clock signal generated by the oscillation circuit 11, so that the LED 10a transmits the near infrared radiation intermittently.

In the first embodiment as described above, since the IC 5 is covered with the light shading portion 1c of the holder 1, it is possible to prevent the IC 5 from an erroneous operation due to light incident upon the IC 5. Further, in this embodiment, although the light shading portion 1c is formed integral with the holder 1, it is of course possible to attach another independent light shading member into the holder 1.

Figure 7:
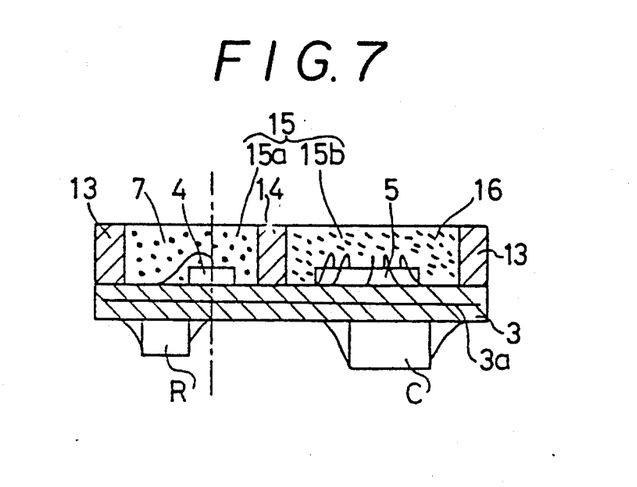
FIG. 7 is an enlarged cross-sectional view showing the circuit block of a second embodiment.
Figure 8:
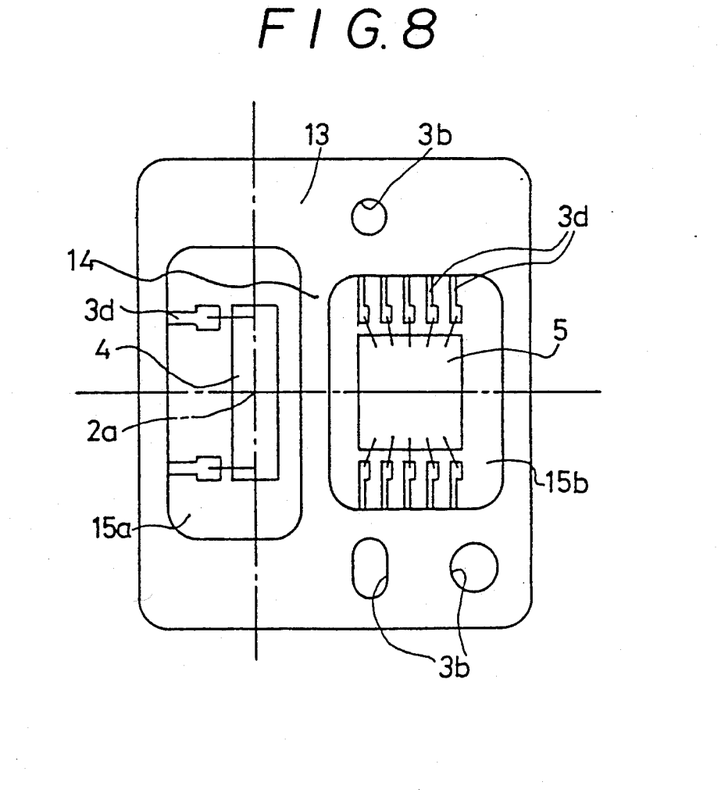
FIG. 8 is an enlarged plan view showing the circuit block shown in FIG. 7, before filled with two different protecting resins.

A second embodiment of the light receiving means of the distance measuring device according to the present invention will be described hereinbelow with reference to FIGS. 7 and 8.

The printed circuit board 3 is of multilayer printed circuit board type in the same way as in the first embodiment. A potting frame 13 is provided on one surface of the printed circuit board 3 so as to enclose the periphery of the board 3, and additionally a partition wall 14 is formed integral with the potting frame 13 so as to cross the frame 13 at roughly the middle portion thereof. A space 15 within the potting frame 13 is divided into two space regions 15a and 15b by this partition wall 14. A bare chip optical sensor 4 is die-bonded in the first space region 15a and a bare chip distance measuring IC 5 is die-bonded in the second space region 15b, respectively for connection with wiring patterns 3d. The first space region 15a is filled with a first protecting resin 7 which can transmit near infrared radiation in the same way as in the first embodiment, and the second space region 15b is filled with a second protecting resin 16 (e.g. epoxy resin mixed with pigment) which can shade light. These protecting resins 7 and 16 are both hardened to seal the optical sensor 4 and the IC 5. On the opposite surface of the printed circuit board 3, resistors R, capacitors C are mounted on the conductive patterns (not shown) of the printed circuit board 3, and both the conductive patterns on both surfaces of the board 3 are connected to each other via through holes (not shown). The construction other than the above is substantially the same as that of the first embodiment.

In this second embodiment, since the optical sensor 4 is sealed by the first protecting resin 7 which can transmit near infrared radiation, it is possible to receive the near infrared radiation and therefore to detect the distance to a subject to be photographed. On the other hand, since the IC 5 is sealed by the second protecting resin 16 which can shade light, it is possible to prevent the IC 5 from being operated erroneously due to light. Further, since both the protecting resins 7 and 16 are separated from each other by the presence of the partition wall 14, it is possible to prevent both the resins from being mixed with each other, so that the transmissivity of the near infrared radiation and the light shading characteristics of the respective protecting resins 7 and 16 can be attained securely.

In the above-mentioned two embodiments, the asymmetrical lens 2 is adopted in such a way that the optical axis 2a thereof is offset from the geometric axis 2b thereof; that is, in such a way that even if the optical sensor 4 is mounted at a position offset away from the middle portion of the printed circuit board 3 (e.g. on the left side in FIGS. 2 and 3), the optical axis 2a of the lens 2 is aligned with the optical sensor 4. Therefore, it is possible to arrange the optical sensor 4 on the same surface of the IC 5, without placing the optical sensor at the central position of a relatively large printed circuit board or to divide the printed circuit board into two boards as with the case of the prior art light receiving section of the distance measuring device, as shown in FIG. 9.

Further, in the above-mentioned embodiments, although the light emitting means 10 emits near infrared radiation having wave lengths from 880 to 940 nm, it is of course possible to use the light emitting means 10 which emits light of different wave lengths. In this case, it is of course necessary to use the optical sensor 4 and the protecting resin 7 which can receive and transmit the light of the same wave lengths as those of the light emitting means 10, respectively. Furthermore, the present invention is applicable to the passive distance measuring device such that distance is measured on the basis of only external light, without use of any light emitting means.

In the distance measuring device according to the present invention, since the optical sensor and the IC can be mounted on the same printed circuit board, it is possible to reduce the mounting area and therefore to minimize the size of the distance measuring device. In addition, since the second printed circuit board, the holding member for the second circuit board, and the flexible cable are all unnecessary, it is possible to reduce the number of the parts and therefore the cost of the device. In particular, since the optical sensor and the IC can be die-bonded on the printed circuit board in the bare chip status, it is possible to simplify the assembly work, while reducing the size and the thickness of the device.

Further, when the bare chip optical sensor and the bare chip IC are sealed simultaneously by the same protecting resin, it is possible to more simplify the mounting work. In this case, a light shading member is provided in front of the IC bare-chip to protect the IC from light, that is, to prevent the IC from erroneous operation.

Further, when the IC bare chip mounting region and the optical sensor bare chip mounting region are separated form each other by use of a partition wall on the printed circuit board, it is possible to prevent the IC bare chip from being operated erroneously by the light allowed to be incident upon the optical sensor bare chip and then introduced through the side of the IC bare chip. In this case, when the IC bare chip is additionally sealed by the light shading potting resin, since the light is securely shaded, it is possible to more securely prevent the erroneous operation of the IC chip.

Further, in the present invention, it is possible to assemble almost all parts of the light receiving section, as a unit, to the holder substantially the same in shape as the prior art holder, without using another member such as a cover. Therefore, the device is simple in structure and compact in shape. In addition, since the light receiving section of the distance measuring device can be provided for a camera by attaching only the holder to the camera, it is possible to provide the distance measuring device of excellent interchangeability, without need of design modifications according to various camera models, with the result that it is possible to markedly reduce the production cost of the cameras in the case of diversified camera production. Further, it is also possible to form the member for supporting the light emitting means integral with this holder, and to assemble the light emitting means and light receiving section as shown in FIG. 1 as a single unit.

In the distance measuring device of the present invention, since the optical sensor is positioned in the close vicinity of the IC, it is possible to reduce electric noise superposed upon the signals transmitted between the two. In addition, when a ground potential level layer is provided between the optical sensor side surface and the opposite side surface, it is possible to further reduce the electric noise transmitted between the two surfaces by the electromagnetic shielding effect upon both the surfaces thereof.

The light receiving lens is formed into asymmetrical shape, and the optical axis thereof is offset from the geometric axis thereof in such a way that even if the optical sensor is mounted at a position offset away from the middle portion of the printed circuit board, the optical axis of the lens is aligned with the optical sensor. Therefore, it is possible to arrange the optical sensor on the same surface of the IC, without locating the optical sensor at the middle portion of a relatively large printed circuit board or to divide the printed circuit board into two boards as with the case of the prior art light receiving section of the distance measuring device.

What is claimed is:

1. A distance measuring device, comprising:
   a light receiving lens for receiving light to be measured;
   a printed circuit board having conductive patterns on both surfaces thereof and disposed at a focus position of said light receiving lens;
   an optical sensor mounted on a light receiving lens side surface of said printed circuit board so as to be aligned with an optical axis of said light receiving lens;
   a distance measuring IC mounted on an optical sensor side surface of said printed circuit board and connected to said optical sensor; and
   electric parts mounted on an opposite-to-IC side surface of said printed circuit board and connected to said IC so as to function as a part of a distance measuring circuit.

2. The distance measuring device of claim 1, wherein an electromagnetic shielding layer connected to a ground potential is provided between both the surfaces of said printed circuit board.

3. The distance measuring device of claim 1, wherein said optical sensor and said IC are both bare chip parts, respectively, and further sealed by protecting resin filled in a potting frame provided at an outer periphery of said printed circuit board.

4. The distance measuring device of claim 3, wherein a partition wall formed integral with said potting frame is positioned between said optical sensor and said IC both of bare chip parts.

5. The distance measuring device of claim 4, wherein said optical sensor is sealed with a first protecting resin which can transmit light having specified wave lengths, and said IC is sealed with a second protecting resin which can shade light.

6. The distance measuring device of claim 1, wherein an optical axis of said light receiving lens is offset from a geometric axis thereof, and mounting position of said light receiving lens is offset from a central position of said printed circuit board.

7. A camera comprising the distance measuring device as defined in claim 1.

8. A distance measuring device, comprising:
   a bare chip state optical sensor provided on a printed circuit board;
   a bare chip state distance measuring IC provided on the printed circuit board in the vicinity of said optical sensor; and
   a protecting resin hardened on said printed circuit board to seal said optical sensor and said IC simultaneously.

9. The distance measuring device of claim 8, wherein said protecting resin transmits light having specified wave lengths.

10. The distance measuring device of claim 8, wherein a light shading member is provided in front of said IC.

11. The distance measuring device of claim 10, wherein said light shading member is formed integral with a holder for supporting said printed circuit board.

12. The distance measuring device of claim 8, wherein a light shading member is provided in front of said IC.

13. The distance measuring device of claim 8, wherein an optical axis of said light receiving lens is offset from a geometric axis thereof, and mounting position of said light receiving lens is offset from a central position of said printed circuit board.

14. The camera comprising the distance measuring device as defined in claim 8.

* * * * *